United States Patent
Jakubek et al.

(10) Patent No.: US 11,348,392 B2
(45) Date of Patent: May 31, 2022

(54) METHOD FOR ACCESS CONTROL

(71) Applicant: DEUTSCHE TELEKOM AG, Bonn (DE)

(72) Inventors: Sascha Jakubek, Cologne (DE); Rudolf Philipeit, Ansbach (DE); Guenter Weick, Wachtberg (DE)

(73) Assignee: DEUTSCHE TELEKOM AG, Bonn (DE)

( * ) Notice: Subject to any disclaimer, the term of this patent is extended or adjusted under 35 U.S.C. 154(b) by 246 days.

(21) Appl. No.: 16/494,316

(22) PCT Filed: Mar. 12, 2018

(86) PCT No.: PCT/EP2018/056012
§ 371 (c)(1),
(2) Date: Sep. 16, 2019

(87) PCT Pub. No.: WO2018/166942
PCT Pub. Date: Sep. 20, 2018

(65) Prior Publication Data
US 2020/0013250 A1    Jan. 9, 2020

(30) Foreign Application Priority Data

Mar. 17, 2017  (DE) ..................... 10 2017 105 771.4

(51) Int. Cl.
*H04L 29/00*       (2006.01)
*G07C 9/00*        (2020.01)
(Continued)

(52) U.S. Cl.
CPC ........... *G07C 9/00904* (2013.01); *G07C 9/27* (2020.01); *H04L 63/062* (2013.01);
(Continued)

(58) Field of Classification Search
CPC ... H04L 63/083; H04L 63/0853; H04L 63/10; H04L 63/062; H04L 63/102;
(Continued)

(56) References Cited

U.S. PATENT DOCUMENTS

| 3,622,991 | A  | * | 11/1971 | Lehrer | .................... | G06K 7/06 |
|           |    |   |         |        |                      | 340/5.5   |
| 7,302,706 | B1 | * | 11/2007 | Hicks  | ................... | G06F 21/562 |
|           |    |   |         |        |                      | 726/24    |

(Continued)

FOREIGN PATENT DOCUMENTS

| EP | 2544155 A1    | 1/2013 |
| JP | 2009215797 A  | 9/2009 |

(Continued)

*Primary Examiner* — Don G Zhao
(74) *Attorney, Agent, or Firm* — Leydig, Voit & Mayer, Ltd.

(57) ABSTRACT

A method for controlling access to a facility includes: an identification process, an authorization process, and an application process. Access to the facility is blocked by a lock that is openable by a person with an authorized key. A system for controlling access to the facility includes a first security ring formed by data-conductive connections between an electronic reader, an identity server, and an access server; a second security ring is formed by data-conductive connections between the electronic reader, the access server, and a terminal; and a third security ring formed by data-conductive connections between the access server, the terminal, and the lock.

3 Claims, 1 Drawing Sheet

(51) Int. Cl.
*H04L 9/40* (2022.01)
*G07C 9/27* (2020.01)

(52) U.S. Cl.
CPC ........ *H04L 63/083* (2013.01); *H04L 63/0853* (2013.01); *H04L 63/102* (2013.01); *H04L 2463/082* (2013.01)

(58) Field of Classification Search
CPC . H04L 2463/082; G07C 9/00904; G07C 9/27; G07C 2209/08; G07C 9/23; G06F 2221/2115; G06F 21/35
See application file for complete search history.

(56) References Cited

U.S. PATENT DOCUMENTS

| | | | | |
|---|---|---|---|---|
| 9,478,086 | B1* | 10/2016 | Berge | G07C 9/00182 |
| 9,647,840 | B2 | 5/2017 | Dietrich | |
| 10,219,154 | B1* | 2/2019 | Hallock | H04L 63/0853 |
| 10,783,338 | B2* | 9/2020 | Mani | G07C 9/00309 |
| 11,139,973 | B2* | 10/2021 | Fujiwara | G07C 9/00857 |
| 2001/0050615 | A1* | 12/2001 | Kucharczyk | A47G 29/141 |
| | | | | 340/568.1 |
| 2003/0172272 | A1 | 9/2003 | Ehlers et al. | |
| 2003/0208386 | A1* | 11/2003 | Brondrup | G07C 9/00904 |
| | | | | 705/5 |
| 2004/0103324 | A1* | 5/2004 | Band | G06F 21/32 |
| | | | | 726/9 |
| 2007/0214493 | A1* | 9/2007 | Davis | H04L 63/0853 |
| | | | | 726/2 |
| 2009/0320088 | A1* | 12/2009 | Gill | G06Q 10/00 |
| | | | | 726/1 |
| 2010/0146045 | A1* | 6/2010 | Moore | G06F 3/067 |
| | | | | 709/203 |
| 2010/0222939 | A1* | 9/2010 | Namburu | G07C 9/28 |
| | | | | 701/2 |
| 2011/0289565 | A1* | 11/2011 | Resch | H04L 63/083 |
| | | | | 726/5 |
| 2012/0059854 | A1* | 3/2012 | Wehrman | G06F 16/10 |
| | | | | 707/782 |
| 2013/0011025 | A1* | 1/2013 | Liu | H04W 4/21 |
| | | | | 382/118 |
| 2013/0027180 | A1* | 1/2013 | Lakamraju | G07C 9/257 |
| | | | | 340/5.53 |
| 2013/0086389 | A1* | 4/2013 | Suwald | G06Q 20/341 |
| | | | | 713/185 |
| 2014/0002236 | A1* | 1/2014 | Pineau | G06F 21/34 |
| | | | | 340/5.6 |
| 2014/0165171 | A1* | 6/2014 | Meng | G06F 21/31 |
| | | | | 726/7 |
| 2014/0189807 | A1* | 7/2014 | Cahill | H04L 63/0861 |
| | | | | 726/4 |
| 2014/0253285 | A1* | 9/2014 | Menzel | G07C 9/215 |
| | | | | 340/5.7 |
| 2014/0282961 | A1* | 9/2014 | Dorfman | H04L 63/0861 |
| | | | | 726/7 |
| 2015/0066283 | A1* | 3/2015 | Wurman | G05D 1/0225 |
| | | | | 701/25 |
| 2015/0278805 | A1* | 10/2015 | Spencer, III | G06Q 20/3278 |
| | | | | 705/44 |
| 2015/0318993 | A1* | 11/2015 | Hamlin | H04L 9/3234 |
| | | | | 713/169 |
| 2016/0028727 | A1* | 1/2016 | Wenninger | G07C 9/38 |
| | | | | 713/168 |
| 2016/0191506 | A1* | 6/2016 | Wang | H04L 63/0853 |
| | | | | 726/7 |
| 2016/0248752 | A1* | 8/2016 | Blinn | H04L 63/0838 |
| 2016/0267738 | A1* | 9/2016 | Carstens | G06F 1/12 |
| 2017/0011573 | A1* | 1/2017 | Belhadia | G07C 9/00563 |
| 2017/0012951 | A1* | 1/2017 | Mennes | H04L 63/06 |
| 2017/0124547 | A1* | 5/2017 | Natarajan | H04W 4/35 |
| 2017/0163647 | A1* | 6/2017 | Cernoch | G06F 21/44 |
| 2017/0195339 | A1* | 7/2017 | Brown | G06F 21/34 |
| 2017/0201881 | A1* | 7/2017 | Davey | G06F 21/31 |
| 2017/0236113 | A1* | 8/2017 | Chitalia | G07C 9/28 |
| | | | | 705/44 |
| 2017/0270732 | A1* | 9/2017 | Troesch | G07C 9/00896 |
| 2018/0007049 | A1* | 1/2018 | Palki | H04L 63/08 |
| 2018/0026954 | A1* | 1/2018 | Toepke | H04L 63/083 |
| | | | | 726/4 |
| 2018/0173906 | A1* | 6/2018 | Rodriguez | H04L 63/102 |
| 2018/0176017 | A1* | 6/2018 | Rodriguez | H04L 63/0861 |
| 2019/0124092 | A1* | 4/2019 | Deutschmann | H04L 63/145 |

FOREIGN PATENT DOCUMENTS

| | | |
|---|---|---|
| JP | 2010211424 A | 9/2010 |
| WO | 2009152628 A1 | 12/2009 |
| WO | WO 2014063990 A1 | 5/2014 |

\* cited by examiner

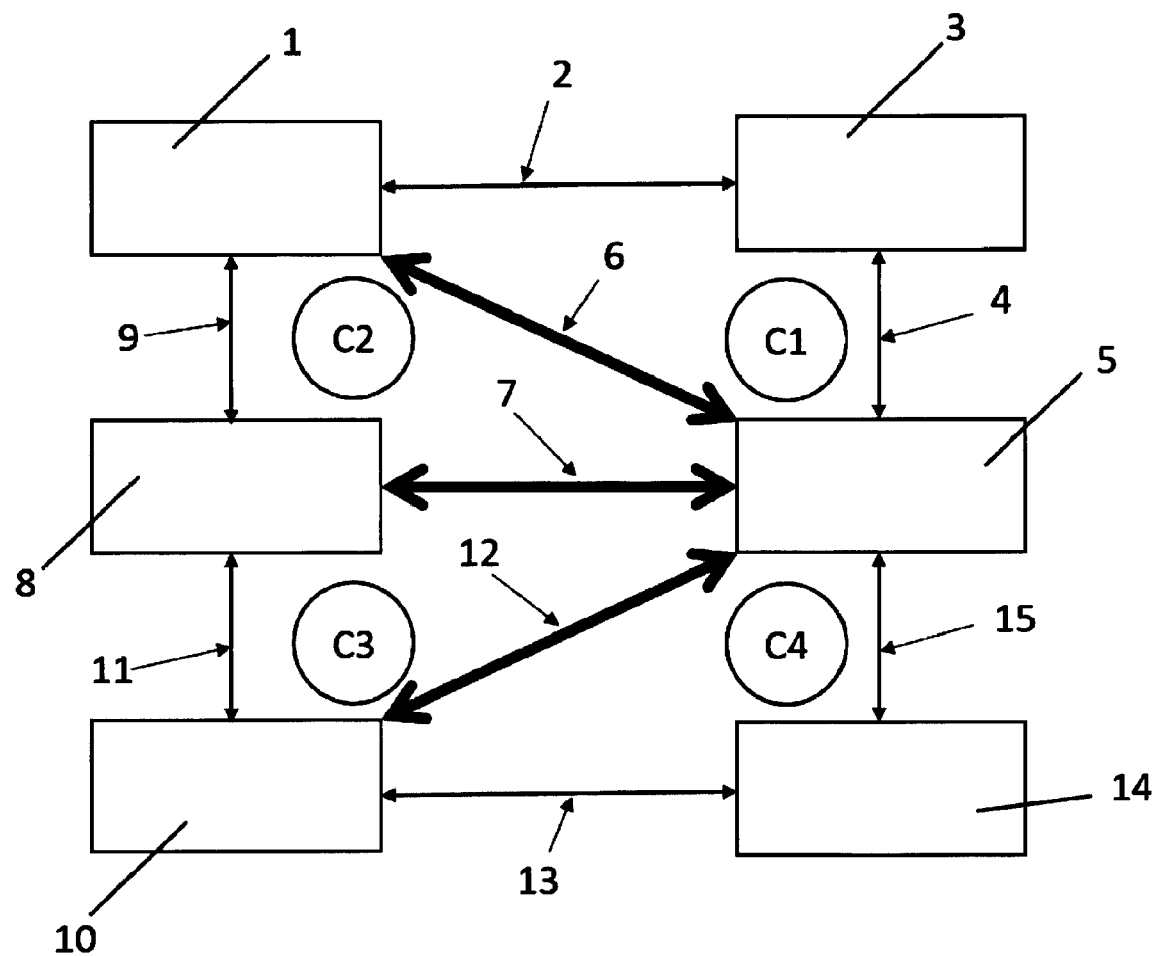

METHOD FOR ACCESS CONTROL

CROSS-REFERENCE TO PRIOR APPLICATIONS

This application is a U.S. National Phase Application under 35 U.S.C. § 371 of International Application No. PCT/EP2018/056012, filed on Mar. 12, 2018, and claims benefit to German Patent Application No. DE 10 2017 105 771.4, filed on Mar. 17, 2017. The International Application was published in German on Sep. 20, 2018 as WO 2018/166942 A1 under PCT Article 21(2).

FIELD

The invention relates to a method for controlling access to a facility, to which access is blocked by a lock. The access system may only be opened by a person with an authorized key. The invention also relates to a system for implementing such an access control.

BACKGROUND

These types of methods protect not only accesses to physical "real" facilities, like buildings and systems, but they also secure digital "virtual" facilities formed by computer systems. Thus, the features "lock" and "key" are not only to be understood mechanically but also relate to electronic accesses to computer systems. The topic of "security" has recently become a central topic, particularly in the digital world, after successful hacker attacks on different sensitive systems have repeatedly become known. There are also corresponding unauthorized access attempts in the real world, even if such are known only in a few cases.

To obtain access to protected facilities like real areas, in particular to rooms, buildings, and grounds, or to protected virtual areas, like web-based services, services, forms, and information, complex method steps must be passed through: thus, it must be initially defined which persons, when, where, and why, may obtain access ("access issues"). In a second step, the identity of the person associated with the respective access issue is then verified, before the individual person is granted, in another step, an access instrument in the form of a key, a card, a token, or an access method. The issued access instruments must then be monitored for their use. Upon loss, the access instruments must be replaced and consequently locks are exchanged or blocked and new passwords are issued. In addition, issued access instruments must be administered and finally taken back.

A method for controlling the access of a user to electronic services on servers is disclosed, for example, in US 2003/0172 272 A1, which represents in principle a two-way authorization with a code and an additional code, as this is known from mobile transaction authentication number (TAN) and short message service (SMS) TAN methods.

The primary problem is that it has not been possible up to now to continuously digitally verify the identity of the person in the context of the access issue. Thus, personnel must repeatedly be used to mediate between the individual method steps and/or the supporting means. Complex, uncomfortable, and unsecure methods are sometimes used to compensate for the existing media breaks.

A method is thereby known from EP 2 544 155 A1, in which a user is authenticated at a central server by means of an identification and an identification code for access to electronic services or for access to a building.

SUMMARY

In an exemplary embodiment, the invention provides a method for controlling access to a facility, wherein access is blocked by a lock that is openable by a person with an authorized key. The method comprises: an identification process, an authorization process, and an application process. The identification process includes: receiving, by an electronic reader, an identification of the person via a certified identity document and an entry of a secret code associated with the certified identity document; receiving, by an identity server, identity data stored on the identity document; confirming, by the identity server, the identity of the person using the identity data and based on the entry of the secret code; and after a successful confirmation, transmitting, by the identity server, a piece of authenticity information to an access server associated with the facility; wherein the electronic reader, the identity server, and the access server are available for data exchange with each other with respect to the identification process during the identification process. The authorization process includes: generating, by the access server, an authorized key using the piece of authenticity information; and transmitting the authorized key to a terminal accessible to the person; wherein the reader, the access server, and the terminal are available for data exchange with each other with respect to the authorization process during the authorization process. The application process includes: opening the lock using the authorized key contained on the terminal.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 schematically shows individual entities of a facility and their interaction according to an exemplary embodiment.

DETAILED DESCRIPTION

Exemplary embodiments of the present invention provide an access method that is simple and inexpensive to implement and easy to operate, and which offers increased security against unauthorized accesses to real and "virtual" environments. In addition, exemplary embodiments of the present invention provide a corresponding system for access control.

According to exemplary embodiments of the invention, an already certified element (that is, an element whose "authenticity" is recognized) certifies other another element. An element has "authenticity" if it may not be copied. Self-contained security rings thus arise, wherein a plurality of such security rings are virtually linked to each other according to the invention. The method thereby begins with a certified identity document of a person, with which identity document this person is identified at an access point correspondingly provided for this. Thus, the invention may also be designated as an "SID access" ("secure identity access") with a "high security chain".

According to the invention, the corresponding method for controlling access to a system is implemented in three process steps:

In a first step, an identification process is carried out, in which the person, who desires access to the system, is identified using an identity document certified as assigned to said person. Public authority certified personal documents, for example, electronically-readable personal identification cards (eID), may be used in particular as the identity document. A secret code, which is known only to the person, is assigned to the identity document. Using such an identity document, the person uses a corresponding reader, in that the reader reads, for example, personal data stored on the identity document. In addition, the person enters the secret code, for example, in the form of a personal identification number (PIN).

The personal data together with the secret code form a first "authenticity", which, however, must initially be verified by the corresponding point. For this purpose, the personal data are transmitted via a data line to an identity server, which may be controlled by a governmental entity. The identity server guarantees that the personal data and the entered code belong together and are not blocked at the run time. If this is the case, then a piece of authenticity information is generated by the identity server and transmitted via a data line to an access server of the system, to which access is desired. The authenticity information certifies the access server, making this virtually "authentic". In this way, a company, that operates an access server, may import a government certified authenticity to the subsequent processing.

It is thereby provided that the reader, the identity server, and the access server are available for data exchange with each other with respect to this identification process during the on-going identification process, and thus form a first security ring. The access server may thus receive personal data from the reader on the one hand and the authenticity information from the identity server on the other hand, which confirms to the server that the person corresponds to the person to whom the identity document is issued.

In another step, an authorization process is now carried out, in which the person, who desires access to the facility, is equipped with an authorized key. For this purpose, the currently certified access server generates such an authorized key on the basis of the present authenticity information and transmits said key to a terminal accessible to the person, in particular to a mobile terminal assigned to the person, for example, the person's own smartphone. Upon receiving this key, the mobile terminal is also currently certified; it consequently has its own "authenticity".

As already explained, the features "lock" and "key" are not only to be understood mechanically, but they also relate to electronic accesses to computer systems. Correspondingly, the feature "facility" comprises both real and virtual systems.

A special feature of the method according to the invention is that the mobile terminal may be one such as the person's own smartphone, which is not associated with the system. In order that the key may be transmitted to the mobile terminal, its electronic address, for example, the telephone number or email address, must be known to the system—thus the access server. It is thereby possible that a special application ("app") is installed on the smartphone, said app being designed for such communication with the system.

Like in the identification process, it is also provided in the scope of the authorization process that the triplet, made from the reader, access server, and mobile terminal, are available for data exchange with each other during the on-going authorization process and thus form a second security ring.

The last step of the method according to the invention may be described as an application process. In this step, the person opens the mechanical or "virtual" lock, thus the access to the system, using the authorized key located on the mobile terminal. In this case, it is also advantageous if the access server, the mobile terminal, and the lock are available for data exchange with each other during the on-going authorization process and thus form a third security ring.

It is additionally advantageous to provide another step in addition to the first three steps in the form of a verification process. The opening of the lock is thereby logged by a logging server in connection with the identity of the authorized key, in order to be able to reproduce all accesses at any point in time. The access server, the lock, and the logging server may all be available for data exchange with each other during the on-going authorization process and thus form a fourth security ring. In general, it is also registered and/or logged when the person leaves the system. Thus, it may be monitored at any time, who is in the system or has respectively been in the system. All accesses are legally traceable using the verification process.

By using the "high security chain" according to the invention, the previous cumbersome process steps, necessary in the analog world for access to such systems, are eliminated and relocated into the digital world by the context-sensitive identification (e.g., with respect to an Internet of Things (IoT) system or an Industrial IoT (IIoT) system). A new dimension for access systems is thereby created using self-administration. By using a unique and permanently certified proof of the identity of a person from the real world, for example, from a population register, spontaneous accesses may be granted, which previously might only have been granted after a very cumbersome process using a visual inspection of an identity document and the associated person.

An advantage of the method according to the invention lies, on the one hand, in a particularly high level of security due to the use of at least a three-fold, advantageously even a four-fold security chaining of the individual steps, respectively the security rings "identification/authentication", "authorization", "application", and optionally "verification/justification". The highest security may be guaranteed by using available, officially-supervised identity cards and the associated reader (secure identity access—SID access) and the underlying officially-supervised infrastructure. The officially supervised infrastructure includes the officially-supervised eID server, which advantageously forms the identity server. In addition, uncopyable identity cards, in particular the electronic personal ID, and the current encryption of the data transmission may be used. Officially-supervised certificates are correspondingly available for all participants using the officially-supervised infrastructure. Thus, a country-wide banned list may be accessed, so that immediate blocks are possible in case of losses.

The invention is not limited to an officially-supervised ID card with an electronic certificate. For example, private service providers in countries, where such IDs do not exist, may take on the officially-supervised tasks and issue such identity cards.

Another advantage lies in that new "intrasec" and "intersec" platforms may be developed. Thus, for large companies, the access server may by operated in-house as an intrasec platform, while small companies may access an intrasec platform operated by a provider. Another advantage lies in that the invention may be implemented in a mobile manner (access via smartphone) and in a stationary manner (access via available terminals). In addition, a high modularity is guaranteed by the granting of privileges and roles, and also a high spatial and chronological variability. In particular, authorized keys may be blocked after an arbitrarily determined time (timeout). The system is additionally highly diverse: it may be implemented in any applications and may thereby completely integrate into the current and future digital world.

An advantage lies in the high scalability of the system. Ultimately, every citizen possesses an identity card, wherein all identity cards may be equipped with eID in the future. Thus, it may be calculated that 70 million new personal identity cards with eID will be in circulation in 2020 in Germany alone. The system does not thereby stop at country borders, but may be used in interconnected states, in particular in the European Union.

Finally, substantial savings in temporal processes and in machine expenses may be realized with the invention because of the completely electronic process configuration.

The invention is subsequently described in greater detail with reference to FIG. 1.

In the following, the invention will be presented using the example of a physical method of access management of a facility. FIG. 1 schematically shows individual entities of a facility and their interaction according to an exemplary embodiment. The invention forms a closed total system with multiple individual components, which are connected via a VPN tunnel to increase the total security.

The individual components are initially the personal identity document of a person, to which a secret code is uniquely assigned, for example in the form of a six-digit PIN. The identity document may be read by an electronic reader 1, which in this case also offers the person the possibility of entering the PIN. The identity document is an uncopyable officially-supervised electronic identity card, for example, the German personal ID, which is used with the associated terminal, in the form of a reader 1, in a closed, tamper-proof way. "Tamper-proof" thereby means that the operating system of reader 1 is loaded from a read-only memory. After each new boot process, an "authentic" original state is produced without any malware. Reader 1 as a terminal is thereby so configured that this is not accessible from outside via the network. All connections only lead outward from reader 1.

The personal data, which is read out, is transmitted via secured data line 2 to an identity server 3 (eID server), which verifies the identity of the person using the personal data on the basis of the code entered, and optionally confirms this. Identity server 3 has an uncopyable hardware secure module (HSM) and is thus another "authentic" component of the total system. It has a logical connection to the governmentally-administered population register of a country.

Upon a successful verification, identity server 3 sends a piece of authenticity information via data line 4 to an access server 5 assigned to the system. Access server 5 is connected on its part to reader 1 via virtual private network (VPN) tunnel 6.

In the authorization process, certified access server 5 generates an authorized electronic key, for example, a token, using the authenticity information, and transmits the key via VPN tunnel 7 to private smartphone 8 of the person who seeks access to the system. Smartphone 8 may contact reader 1 electronically or optically through connection 9. Smartphone 8 is not a component of the closed total system, so that any unsecured terminal may be used as a carrier medium for the key. In the application process, the person opens lock 10 using the authorized key located on smartphone 8. For this purpose, smartphone 8 and lock 10 are connected such that data are carried via line 11. In this case, line 11 may also be an optical path. Lock 10 is thus controlled from smartphone 8 and access server 5, which releases the desired access via data line 12.

At the same time, lock 10 transmits logging information via data line 13 to logging server 14, which in turn is connected to access server 5 via data line 15. The logging server functions as a logging instance for potential later evidence. It is clear from the stored data who granted which access authorization to which person, when, and why, and how this person used the access authorization.

The individual components interact in four security rings (C1 to C4), which each always have a mutual path with the neighboring circuit. Thus, a chain is created from four highly secure elements (high security chain—HSC). First security ring C1 symbolizes the identification, second security ring C2 symbolizes the authorization, third security ring C3 symbolizes the application, and fourth security ring C4 symbolizes the verification. The interplay of the distributed individual components in the total architecture SID access is clarified by way of FIG. 1.

Each security ring includes at least three components and symbolizes an authentication during the cycle. The authenticity of a cycle is thus achieved in that in each case, a third authenticity is generated from two authenticities. This third authenticity represents, together with one of the first two authenticities, the authentication duo for the next security ring. The high security chain according to the invention is able, in the security chain depicted, to transport an authenticity across system worlds, in this case from the officially-supervised system to a private application. A logging instance at the end of the security chain registers the processes. Similar to a blockchain, the individual processes are detectably fused. Thus, the chain is consolidated again with its originating point.

In security ring C1, the identification is guaranteed by the connection of an encapsulated system including reader 1 and identity server 3. This connection is closed into security ring C1 by two connections 4 and 6.

The existing connection of reader 1 to access server 5 is authentic, consequently trustworthy, for the duration of the browser session. In this connection, reader 1 and access server 5 are authentic and may thus accept key 8 into their circle. Thus, security ring C2 of the authorization is closed. The storing of associated, securely-encrypted secrets through key 8 and access server 5 permanently represent two additional authentic components for next security ring C3, the application.

The coordinated secrets of key 8 and access server 5 enable the activation of security ring C3 at a later point in time. Key 8 and lock 10 are now located in security ring C3, via which the SID access is enabled. The access itself is thereby the newly configured authenticity in security ring C3.

To secure the high security chain according to the invention, a fourth security ring C4 is used. The authenticity, "lock is opened" is prepared by access server 5 and signaled to logging server 14 by lock 10. After the logging entry in logging server 14 has been compared and stored in the connection, access server 5 receives the corresponding signal to definitively open the lock.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for controlling access to a facility, wherein access is controlled by a lock that is openable by a person with an authorized key, wherein the method comprises:
  performing, using a first security ring, an identification process, wherein the first security ring comprises a tamper-proof electronic reader, an identity server, and an access server in communication with one another, wherein the tamper-proof electronic reader has an operating system loaded from a read-only memory, wherein the identity server is controlled by a governmental entity, and wherein performing the identification process includes:
    receiving, by the tamper-proof electronic reader, an identification of the person via a certified identity document and an entry of a secret code, wherein the certified identity document is a government-issued ID;
    receiving, by the identity server, personal data stored on the identity document;
    confirming, by the identity server, using the personal data and based on accessing a governmentally-administered population register, that the secret code which was entered corresponds to the identification of the person received via the certified identity document; and
    in response to confirming that the secret code which was entered corresponds to the identification of the person received via the certified identity document, transmitting, by the identity server, a piece of authenticity information to the access server, wherein the access server is associated with the facility;
  performing, using a second security ring, an authorization process, wherein the second security ring comprises the tamper-proof electronic reader, the access server, and a mobile terminal in communication with one another, wherein the mobile terminal is assigned to the person, and wherein performing the authorization process includes:
    generating, by the access server, the authorized key using the piece of authenticity information for certifying the mobile terminal; and
    transmitting, by the access server, the authorized key to the mobile terminal to certify a current authenticity of the mobile terminal, wherein the mobile terminal is accessible to the person; and
  performing, using a third security ring, an application process, wherein the third security ring comprises the access server, the mobile terminal, and the lock in communication with one another, and wherein performing the application process includes:
    opening the lock using the authorized key contained on the mobile terminal based on execution of an application on the mobile terminal; and
  performing, using a fourth security ring, a verification process, wherein the fourth security ring comprises the access server, the lock, and a logging server in communication with one another, and wherein performing the verification process includes:
    logging, by the logging server, the opening of the lock in connection with the identification of the person.

2. The method according to claim 1, wherein the authorized key is blocked after a predetermined time period.

3. A system for controlling access to a facility whose access is controlled by a lock that is openable by a person with an authorized key, the system comprising:
  a tamper-proof electronic reader having an operating system loaded from a read-only memory;
  an identity server controlled by a governmental entity;
  an access server;
  a mobile terminal assigned to the person;
  the lock; and
  a logging server;
  wherein the tamper-proof electronic reader, the identity server and the access server being in communication with one another form a first security ring, wherein the first security ring is configured to perform an identification process, wherein performing the identification process includes:
    receiving, by the tamper-proof electronic reader, an identification of the person via a certified identity document and an entry of a secret code;
    receiving, by the identity server, personal data stored on the identity document;
    confirming, by the identity server, using the personal data and based on accessing a governmentally-administered population register, that the secret code which was entered corresponds to the identification of the person received via the certified identity document; and
    in response to confirming that the secret code which was entered corresponds to the identification of the person received via the certified identity document, transmitting, by the identity server, a piece of authenticity information to the access server, wherein the access server is associated with the facility;
  wherein the tamper-proof electronic reader, the access server and the mobile terminal being in communication with one another form a second security ring, wherein the second security ring is configured to perform an authorization process, wherein performing the authorization process includes:
    generating, by the access server, the authorized key using the piece of authenticity information for certifying the mobile terminal; and transmitting, by the access server, the authorized key to the mobile terminal to certify a current authenticity of the mobile terminal, wherein the mobile terminal is accessible to the person;

wherein the access server, the mobile terminal, and the lock being in communication with another form a third security ring, wherein the third security ring is configured to perform an application process, wherein performing the application process includes:

opening the lock using the authorized key contained on the mobile terminal based on execution of an application on the mobile terminal; and wherein the access server, the lock, and the logging server form a fourth security ring, wherein the fourth security ring is configured to perform a verification process, wherein performing the verification process includes:

logging, by the logging server, the opening of the lock in connection with the identification of the person.

* * * * *